(12) United States Patent
Davidson et al.

(10) Patent No.: US 10,974,909 B2
(45) Date of Patent: Apr. 13, 2021

(54) MAGNET SWITCH FOR A TRANSPORT SYSTEM

(71) Applicant: Krones AG, Neutraubling (DE)

(72) Inventors: Hartmut Davidson, Zeitlarn (DE); Thomas Kiendl, Maxhütte-Haidhof (DE); Stefan Poeschl, Sinzing (DE); Michael Neubauer, Grassau (DE); Martin Kammerl, Hemau (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 16/614,616

(22) PCT Filed: May 3, 2018

(86) PCT No.: PCT/EP2018/061248
§ 371 (c)(1),
(2) Date: Nov. 18, 2019

(87) PCT Pub. No.: WO2018/210569
PCT Pub. Date: Nov. 22, 2018

(65) Prior Publication Data
US 2020/0180872 A1   Jun. 11, 2020

(30) Foreign Application Priority Data
May 18, 2017   (DE) .......................... 102017208455.3

(51) Int. Cl.
*B65G 47/64*      (2006.01)
*B65G 54/02*      (2006.01)
(Continued)

(52) U.S. Cl.
CPC .............. *B65G 47/64* (2013.01); *B60L 13/03* (2013.01); *B65G 54/02* (2013.01); *H02P 25/06* (2013.01); *B65G 2203/0283* (2013.01)

(58) Field of Classification Search
None
See application file for complete search history.

(56) References Cited

U.S. PATENT DOCUMENTS

| 5,778,796 A | * | 7/1998 | Kim | ........................ B60L 13/10 104/130.07 |
| 9,617,089 B2 | * | 4/2017 | Josefowitz | .............. E01B 25/34 |

(Continued)

FOREIGN PATENT DOCUMENTS

| DE | 2623888 A1 | 12/1977 |
| DE | 20209174 U1 | 10/2003 |

(Continued)

OTHER PUBLICATIONS

ISA/EP, International Search Report and Written Opinion of the International Searching Authority, International Application No. PCT/EP2018/061248, dated Aug. 1, 2018, 17 pages.

*Primary Examiner* — William R Harp

(57) ABSTRACT

A switch of a transport system for a movable transport element includes a main track and a secondary track branching off the main track. The movable transport element can be guided from a transition region in which the secondary track branches off from the main track. Devices for increasing a switching force to guide a moveable transport element along the main track or transfer the movable transport element to the secondary track are provided in the transition region.

10 Claims, 8 Drawing Sheets

(51) Int. Cl.
  *H02P 25/06*  (2016.01)
  *B60L 13/03*  (2006.01)

(56) References Cited

U.S. PATENT DOCUMENTS

| | | | | |
|---|---|---|---|---|
| 10,622,921 | B2* | 4/2020 | Weber | B65G 54/02 |
| 2007/0044676 | A1 | 3/2007 | Clark et al. | |
| 2008/0115372 | A1* | 5/2008 | Vogel | G01D 5/485 33/1 Q |
| 2016/0207719 | A1* | 7/2016 | Josefowitz | B60L 13/10 |
| 2018/0323732 | A1* | 11/2018 | Weber | H02P 21/06 |
| 2019/0389675 | A1* | 12/2019 | Kleinikkink | H02K 7/08 |

FOREIGN PATENT DOCUMENTS

| | | |
|---|---|---|
| DE | 102013218389 A1 | 3/2015 |
| EP | 3109998 A1 | 12/2016 |
| WO | 2015013824 A1 | 2/2015 |

\* cited by examiner

MAGNET SWITCH FOR A TRANSPORT SYSTEM

CROSS-REFERENCE TO RELATED APPLICATIONS

This application is a 371 National Stage of International Application No. PCT/EP2018/061248, filed May 3, 2018, which claims priority to German Patent Application No. 102017208455.3, filed May 18, 2017, the disclosures of which are herein incorporated by reference in their entirety.

BACKGROUND

The invention relates to a magnet switch, hereinafter referred to only as a switch, for a transport system in which one or more movable transport element/s with a magnetic reaction element, also referred to as a mover, is/are movable along a transport track by way of one or more linear motor sections (also referred to as stators). The invention also relates to a transport system comprising such a switch and optionally one, two, or several movable transport elements, as well as a transport element that is configured for use on such a switch. The transport system can be configured in particular for use in the beverage industry, e.g. in a beverage filling system.

Such transport systems with a linear motor drive are known from prior art. For example, DE 10 2013 218389 A1 shows a device and a method for switching a passive switch for transport systems with linear motors.

In the transport systems, a defined advancing force can be applied to each individual movable element along a transport track by the interaction of magnetic fields generated at one or more linear motor sections and a magnetic reaction element that is attached to the movable transport element. The magnetic reaction elements on the movable transport elements can consist of permanent magnets and/or non-switching electromagnets, or comprise them. A non switching electromagnet is typically an electromagnet connected to a power supply and/or to a control unit of the transport device in such a way that preferably controllable electrical current passes therethrough, always in the same direction. The systems can be modular, i.e. can be assembled from prefabricated modules. The modules can comprise straight and curved tracks and, in particular, switches.

It is also known to use a normal force (magnetic normal force) such which is a retaining force of the movable transport elements respectively in the direction of the adjacent linear motor section (or the adjacent linear motor sections), to guide the movable transport elements on the transport track. The minimum achievable distance between the movable transport elements and the linear motor sections as yell as a displacement transverse to the axis of motion can be limited and/or guiding the movable transport element on the transport track can be defined by way of mechanical components (hereinafter also referred to as a guide or a guide curve).

When using two oppositely disposed stators in the transition region, in that the secondary track branches off form the main track, magnetic switches can be created in which the magnetic normal forces on both sides are lifted, so that there is no preferred direction. Typically, the magnetic reaction element engages between the two linear motor sections.

By selectively energizing the linear motor sections on both sides of the movable transport elements, the forces in the transition region can now be influenced. In particular, the resulting force can be increased on the desired switch side and the switch can thus be switched such that the movable transport element is directed in the desired direction. The force for selectively guiding the movable transport element along the main track or in the direction of the secondary track, there by way of example by selectively energizing the linear motor sections in the transition region of the switch, is referred to as the switching force.

Such transport systems are also referred to as long stator linear motors and are known, for example, from WO 2015 013824 A1.

The normal force (magnetic normal force) in this application means a force which forms due to the magnetic reaction element at the movable transport element between the latter and the linear motor sections, where in particular the normal force can typically also be present due to the magnetic reaction element without applying current to the linear motor sections.

It can be based, for example, on the reluctance force between the magnetic reaction element on the movable transport element and the core in the stator, typically an iron core. It can serve, in particular, to stabilize or retain the movable transport elements during transport relative to the stators, in particular to retain them on a guide. in addition to the normal forces, switching forces are now also employed in the switch region which are based on an interaction between the magnetic fields of the movable transport element and the stator(s). These switching forces are superimposed onto the normal force.

Additional forces can arise due to tolerances from production or arise during operation with respect to the distances between movable transport elements and stators, and due to magnetic strength of electromagnets possibly employed in the movable transport elements. Such tolerances can cause the normal forces to be greater in the direction of one stator than the normal forces of the stator arranged on the other side, so that this can lead to malfunctions.

SUMMARY

The invention comprises a switch of a transport system for a movable transport element, a transport element as well as a transport system comprising such a switch. The transport system can be designed, in particular, for use in the beverage industry, e.g. in a beverage filling system.

According to the invention, the relationship of the normal force to the switching forces in the switch region should be selected such that the switch functions reliably. Since the disturbances are typically greater the greater the normal force, optimization of the relationship between the normal force to e switching force typically also changes the relationship of disturbances to the switching force.

In a switch according to the invention, the normal force and/or the switching force in the transition region of the switch can therefore be selected in such a way that the switch functions reliably.

In the region of the switch, in particular the transition region in which the secondary track branches off the main track, the transport system is typically configured in such a way that the guiding effect of the normal force is irrelevant, i.e. in particular reduction of the normal force does not harm the system. This can be done, for example, by a guide, e.g. on the stators. Such a guide can be present, for example, only in the region of a switch, only in the transition region of a switch, or optionally also in other or all regions of the transport system.

According to the invention, the switch of a transport system for a movable transport element comprises a main track as well as a secondary track branching off, where the movable transport element is optionally guided from a transition region, in which the secondary track branches off from the main track, along the main track or transferred into the secondary track. The direction of motion of the transport element is such that it moves along the main track in the direction of the transition region such that it can optionally be guided further along the main track or transferred into the secondary track and then, after passing through the switch, be moved on either further along the main track or along the secondary track (hereinafter also referred to as: direction of motion towards the switch). When "upstream" or "downstream" is used hereafter, then this direction of motion is assumed. Of course, the movable transport element can also be transported from the secondary track to the main track or along the main track if it is moved in the opposite direction. However, since no selection of the track must be made on which the movable transport element is guided, the switching, according to which a movable transport element is guided from one of the two secondary tracks to the main track of the switch, shall not be further dealt with hereafter. A switching force with which the movable transport element can be either guided on the main track or transferred to the secondary track can typically be generated by the linear motor sections.

According to the invention, devices for changing the normal force can be provided in the transition region.

The transition region can, in particular, comprise the region or be the region between the point of the transport track at which a second linear motor section is added adjacent to the transport element, if the transport element to other regions is only driven by one linear motor section, and the point of the transport track at which the transport element is driven only by the linear motor section of the main track or the linear motor section of the secondary track and/or (substantially) only affected thereby.

If the transport element in the transport system is moved by two linear motor sections, then the transition region can alternatively comprise the region or be the region in which the two linear motor sections next to the main track are no longer guided parallel to each other (diverge) and where the linear motor sections arranged next to the secondary tracks do not yet run parallel to each other. In such a case, typically two linear motor sections in fact engage at the switch tip, so that the transport element can again be moved also in the secondary tracks by two linear motor sections. The beginning of the transition region can be referred to as that part of the transition region which is passed through by a transport element first when it is guided toward the switch in the direction of motion on the main track, i.e. the region at which the two linear motor sections next to the main track begin to diverge (or would begin to diverge if they were guided parallel to the edge of the transport track).

The transition region can comprise a region in which one (each) transport element takes the same path, regardless of whether it is then guided further along the main track or into the secondary track. In this region, two linear motor sections can optionally be guided parallel to each other next to the main track (or be arranged in such a way that they would be guided in parallel if they were guided parallel to the edge of the transport track). If this region is comprised by the transition region, devices for increasing the switching force and/or for changing or reducing the normal force can already be provided in this part of the transition region. A force effect on the transport element which causes reliable guidance in the desired direction can be ensured even upstream of the separation of the paths, either along the main track or into the secondary track.

In particular, the devices for changing the normal force can be provided, for example, in this transition region of the switch. The provision of "devices in the transition region of the switch" can comprise, in particular, that those devices are provided in (at least) part of the transition region of the switch or in the entire transition region of the switch.

When giving relative statements in this text, in particular changing, reducing and increasing the normal force (or field strength, number of turns, etc.), then this statement is given in comparison to another region of the switch, e.g. a region outside the transition region of the switch, and/or any other region of the switch or transport system. In particular, the relative statements can be given, for example, in comparison to the corresponding force or magnitude between a movable transport element and the linear motor section in the transition region of the switch and the transport element and the corresponding linear motor section that is downstream, e.g. downstream at the end of the switch, and/or upstream.

In the case of a transition region, in particular, a transition region comprising a region in which the linear motor sections are guided parallel to each other next to the main track, the devices for increasing the switching force and/or for changing or reducing the normal force in the transition region are typically formed in such a way that they can change the respective force, e.g. the normal or the switching force, in comparison to the forces between the respective transport element and the linear motor section downstream of the transition region and/or in comparison to the normal or the switching force that would be generated (or was generated) if the normal force or a switching force was generated by way of the linear motor section(s) in other regions of the transport system. For example, if the movable transport element is driven downstream of the transition region by a linear motor section, then the normal force between this linear motor section and the transport element in the transition region can be changed (reduced, increased). In addition, a further normal force component can be present in the transition region, e.g. due to an added linear motor section, which is also changed (reduced, increased) as compared to the normal force between the added linear motor section and the movable transport element.

The devices for changing the normal force can be provided in particular to reduce the normal force. For example, these devices can be suitable to influence the normal force in such a way that it is lower in the transition region, in particular, for example downstream of the transition region.

For example, in the transition region of the switch, the air gap between the two linear motor sections and a moving transport element can be enlarged, for example, larger than downstream of the transition region.

By enlarging the air gap in the switch region, the (magnetic) normal force, which typically reduces by the power of two with the width of the air gap, reduces faster than the switching forces which typically reduce linearly therewith, so that the relationship between the switching force and the normal force improves with an enlarging air gap.

Such an enlargement of the air gap between the two linear motor sections and a moving transport element can be carried out in particular in that, in the transition region of the switch, the two linear motor sections are offset in relation to the boundary of the transport track, i.e. do not run at the same distance from the edge of the transport track like in other regions of the switch (e.g. downstream at the end of the switch), but are in the transition region set with a greater distance to the respective edge of the transport track.

Alternatively or additionally, the air gap between the two linear motor sections and a moving transport element can also be enlarged in that the linear motor sections are installed rotated in relation to the normal direction of installation in relation to each other and to the transport track (or the edge of the transport track).

Alternatively or additionally, the air gap between the two linear motor sections and a movable transport element can also be enlarged in that the distance between the transport element and the linear motor sections is enlarged by a special guide curve for the transport element, i.e. the guide curve in the transition region of the switch is guided in such a way that a greater distance between the linear motor sections and the transport element arises than in other regions of the switch, e.g. downstream at the end of the switch. This can be done, for example, in that the guide curve leads the transport element away from the edge of the transport track.

Additionally or alternatively, the transition region can be enlarged by a wider formation of the transition region, i.e. the two linear motor sections in the transition region are guided with a greater distance to the guide curve than in other regions of the switch (e.g. downstream at the end of the switch).

Alternatively or additionally, the normal force can be reduced in that the magnetic conductivity of the linear motor sections is reduced in the transition region, i.e., for example, is smaller than in another region of the switch, e.g. downstream of the transition region.

The magnetic conductivity of the linear motor sections in the transition region can be reduced, for example, in that (at least) the ferromagnetic part of the linear motor sections in the transition region are formed to taper, thus becoming narrower. Thereby, for example, its core, such as, an iron core, can be formed thinner in that region. This can reduce the magnetic conductivity of the linear motor sections as compared to regions where the ferromagnetic part of the linear motor sections is not tapered. The normal force in the regions of the taper can thus be reduced. Only the core of the linear motor sections in the transition region can then be tapered and optionally the outer boundary of the linear motor sections can be unchanged in their diameter, or alternatively the linear motor sections themselves can also be tapered.

Alternatively or additionally, a part of the linear motor base body in the transition region can be made of a different material than, in particular, the linear motor base body in at least one other region, for example, downstream at the end of the switch. The linear motor base body is typically made of iron. The different material typically exhibits a lower magnetic conductivity (magnetic permeability), so that the magnetic conductivity can be reduced. The linear motor base body in the transition region can there be partially or entirely made of the different material.

In some embodiments, a current supply can be provided in the transition region and allow actuating two independently actuatable electromagnets on a transport element, each facing a linear motor section. The actuation can be possible or be coupled independently of each other for the two electromagnets. The current supply is typically configured in such a way that the first electromagnet of the transport element can be switched such that the normal force is increased on the side facing a first linear motor section, and the second electromagnet is switched such that the normal force on the side facing the second linear motor section is reduced. A reverse connection is typically also possible, so that the transport element can optionally be guided along the main track or transferred into the secondary track. The change of the normal force can thus contribute to the transfer of the movable transport element into the selected track (increase the switching force).

The invention further comprises a movable transport element for a transport system. The movable transport element is typically configured to be moved on a transport system and typically comprises, in particular, a magnetic reaction element with which the transport element is movable on the transport track, typically along a guide, and controlled by the linear motor sections.

In addition to the magnetic reaction element, the movable transport element can also comprise two independently switchable electromagnets and/or the magnetic reaction element can be formed by two independently switchable electromagnets. These electromagnets are typically formed in such a way that they can be actuated separately in the transition region of the switch, e.g. with a current supply described above, so that the normal force on the side facing one linear motor section can be reduced and on the other side be increased so that the transport element can be guided more reliably optionally along the main track or into the secondary track of the switch.

According to the invention, devices for increasing the switching force can be provided for a switch in the transition region.

In particular, the linear motor sections, for example, in the transition region, can be formed in such a way that the magnetic field strength of the linear motor sections can be switched higher than, in particular, downstream of the transition region in the main track and/or the secondary track and/or upstream. This can mean, in particular, that the magnetic field strengths of the linear motor sections for this region that are possible for safe operation are higher.

An increase in the field strength in the linear motor sections increases the interaction between the linear motor sections (stators) and the movable transport element (more precisely: the magnetic reaction element or elements or other (passive) magnetic elements of the movable transport element). With a higher magnetic field strength, in particular, the resulting switching force can be increased.

In this case, the switching force can be effected in that only one linear motor section is energized and thus exerts an attracting force in the direction of the selected track (main or secondary track), while the other is not energized, so that the movable transport element is guided in a direction and to the desired track. Instead of not energizing a linear motor, the latter can alternatively be energized such that it exerts a repelling force upon the movable transport element, so that the repelling effect additionally "pushes" the movable transport element in the direction of the desired track.

Such formation of the linear motor sections allowing higher switching of the magnetic field strength can comprise, for example, that the number of turns of the linear motor sections in the transition region is higher than at least any other point of the switch or the transport system, in particular, e.g. downstream at the end of the switch and/or upstream of the transition region. With a higher number of turns, the maximum possible advance speed reduces, so that switches with an increased number of turns can typically be used in transport systems in which the same advance speed as upstream on the switch need not be realized.

Alternatively or additionally, the current-carrying capacity of the linear motor sections in the transition region can be increased, e.g. be higher than downstream and/or upstream of the transition region. This can be made possible, for example, by using coils with higher coil cross-sections. With such larger coil cross-sections, the same thermal load can be obtained at a higher electric current, i.e. the thermal limits can still be observed.

Alternatively or additionally, components with higher thermal limits allowing an increase in the electric current can be employed.

Alternatively or additionally, heat dissipation can be improved in the transition region, e.g. be better than in a region downstream and/or upstream. Better heat dissipation can be achieved by better cooling, such as with additional cooling fins, water cooling, improved water cooling or the installation of a fan, and/or improved convection. Additional cooling can increase the current-carrying capacity because the thermal limits are then reached less quickly than without cooling.

Alternatively or additionally, the switch can comprise actuatable coils in the transition region which are present in addition the coils of the linear motor sections and are suitable for increasing the switching force in combination with one or more magnetically conductive passive components on a movable transport element.

For example, additional coils can be comprised in the transition region of the switch. They can be arranged, for example when visualizing a plane that passes through the two linear motor sections, perpendicular to the plane above and below (or to the right and the left of) this plane. The coils can be arranged together with the linear motor sections in a plane perpendicular to the visualized plane through the linear motor sections. If the coils have a width that differs from that of the coils of the linear motor sections, the plane visualized typically relates to the plane of the coil side facing the movable transport element. Alternatively, they can be offset rearwardly in the direction parallel to the visualized plane through the linear motor sections in the direction of the transport track.

A transport element according to the invention can comprise one or more magnetically conductive passive components which are arranged in such a way that they can interact together with the previously described coils, which can be present in the transition region in addition to the coils of the linear motor sections, to increase the switching force. In particular, the switching force can be increased in the selected direction along the main track or into the secondary track by the interaction between these coils and the magnetically conductive passive components.

Passive components can be configured, for example, as part of the transport element and be made of ferromagnetic material such as iron, or comprise such. They typically correspond in dimensions, at least in height, (approximately) to the dimensions of the additionally provided coils and are typically also spatially located in this plane. Such a passive component is typically at most as wide as the magnetic reaction element on the transport element. The height is typically based on the force to be achieved and is typically in the range of about 5 to 10 mm.

The invention furthermore comprises a transport system for a movable transport element which comprises at least one transport track with at least one switch as described above. The transport system can be designed, in particular, for use in the beverage industry, e.g. in a beverage filling system. A transport system can optionally comprise one or more additional switches and/or modular continuations of the main and/or secondary track. Such a transport system typically comprises a guide curve or other mechanical components along which the movable transport element is guided on the transport track. Such a transport system can comprise a transport element described above or several of the transport elements described above.

The devices for increasing the switching force and changing the normal force can be used in any combination. For example, a simultaneous change (reduction) of the normal force together with an increase in the switching force, e.g. by additional coils and/or electromagnets, can achieve an even more reliable supply of the transport element to the desired track of the switch.

The invention also comprises a method for switching one or more of the components described above in a transport system in order to transfer a movable transport element to the selected track (along the main track or into the secondary track).

BRIEF DESCRIPTION OF THE DRAWINGS

Further embodiments shall be described below in view of the figures, where.

DETAILED DESCRIPTION

Figure 1A:
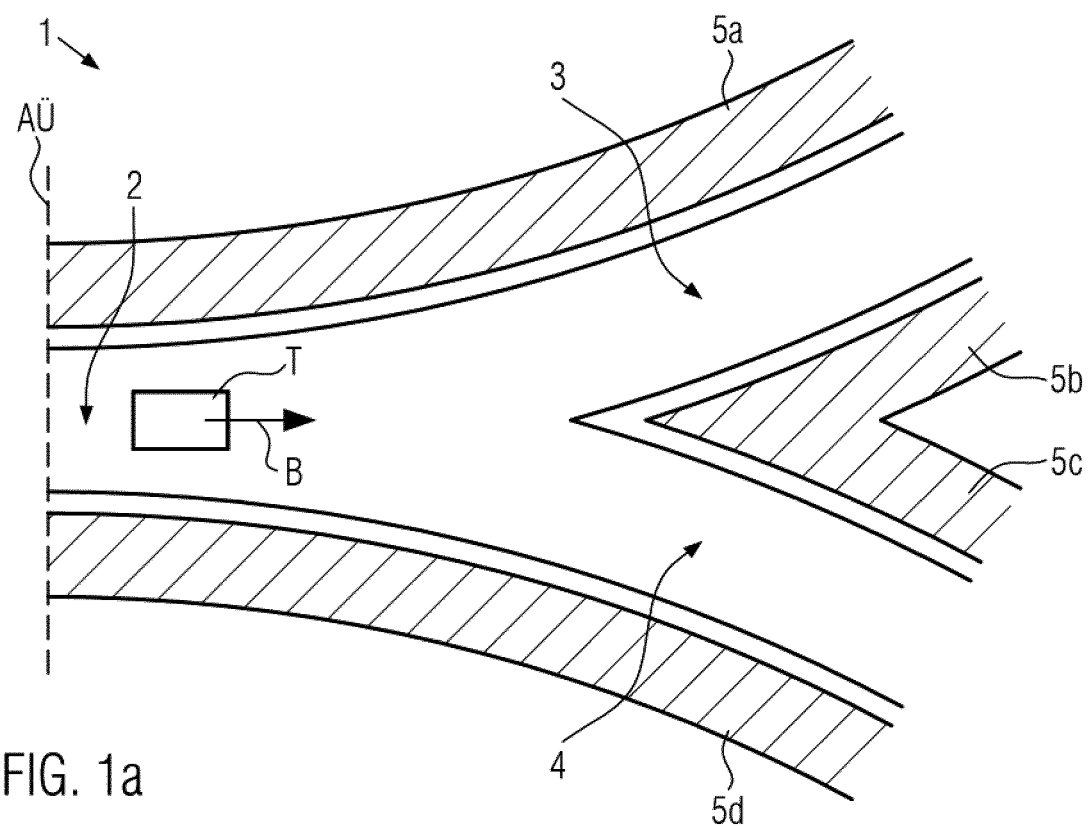
FIG. 1a and FIG. 1b show a prior art switch.

FIG. 1a shows such a switch 1 known from prior art. It comprises a transition region 2, a main track 3, and a secondary track 4 into which movable transport element T can optionally be transferred in direction of motion B (toward the switch). Such a transfer only works, of course, if the movable transport element moves in the direction of motion B on the transport track. A correspondingly reverse direction of motion is typically also possible. However, since the choice of direction does not have to be made in this case, this case shall not be discussed further hereafter.

Along the main track, linear motor sections 5a and 5d in the transition region first run in parallel, in the transition region of the switch, linear motor sections 5a and 5d part from each other (diverge so that they no longer run in parallel). Downstream of the transition region, linear motor section 5a is guided along main track 3 and linear motor section 5d along secondary track 4. Linear motor sections 5b and 5c engage at the tip of the switch, so that movable transport elements T are guided by two linear motor sections running parallel to each other, also downstream of the branch-off. Linear motor section 5b then runs parallel to linear motor section 5a, whereas linear motor section 5c runs parallel to linear motor section 5d, so that linear motor sections 5a and 5b together can accelerate a transport element on secondary track 3 and linear motor sections 5c and 5d together can accelerate a transport element T on secondary track 4.

An exemplary beginning of transition region AÜ is drawn in in FIG. 1a where linear motor sections 5a and 5d begin to diverge. This beginning of the transition region can alternatively also be in another location, e.g. can be shifted further to the left in the figure, and the transition region can comprise a region of the main track in which linear motor sections 5a and 5d run in parallel (not shown).

Figure 1B:
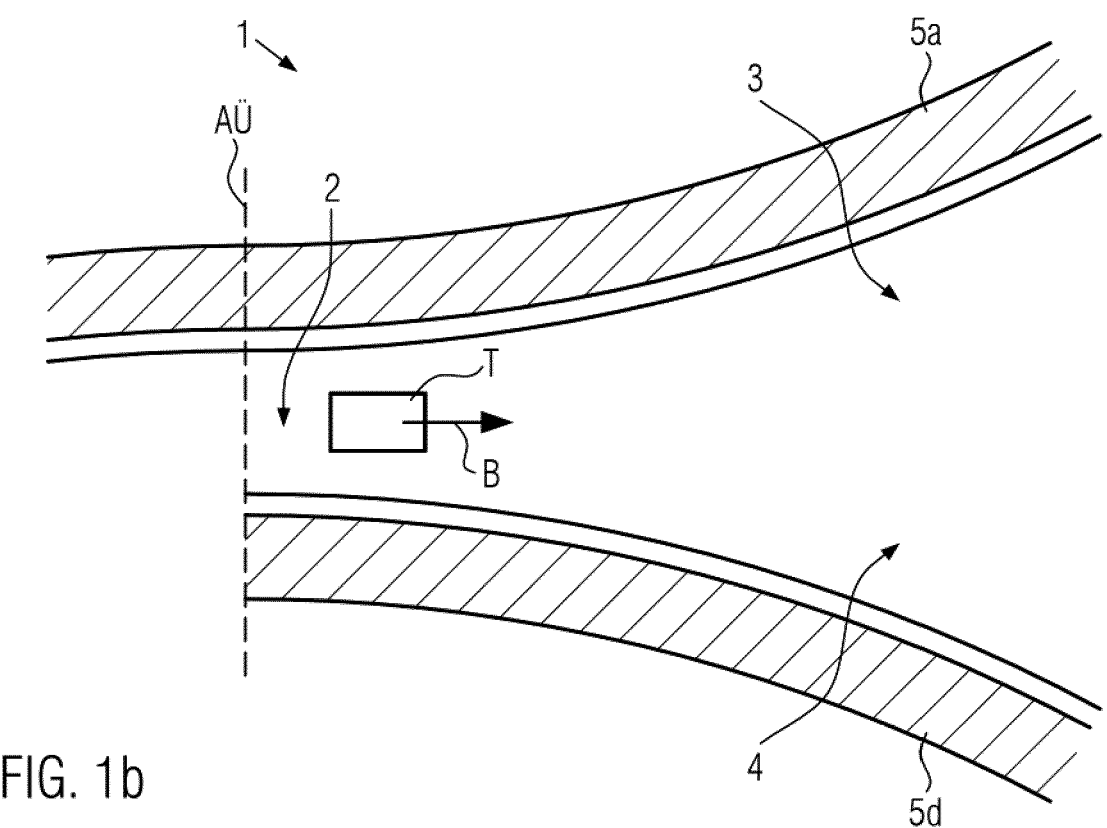

In other prior art embodiments, such as shown in FIG. 1b, the transport elements are moved along main track 3 only by one linear motor section 5a, and only in transition region 2 is another linear motor section 5d added with which the movable transport element can optionally be transferred to secondary track 4. An exemplary beginning of transition region AÜ is also marked. In the transition region of a switch (in prior art as well as with the switches described below, e.g. the switches of FIGS. 2b, 3b, 4b, 5b) linear motor sections 5a and 5d in the transition region can optionally run in parallel in one region, before they part to lead along the main track or the secondary track (not shown). In such a case, the transition region, as explained by way of example for FIG. 1a, can also begin at a different location, e.g. be shifted further to the left in the figure, in particular, at the beginning of the region in which the second linear motor section joins.

Figure 2A:
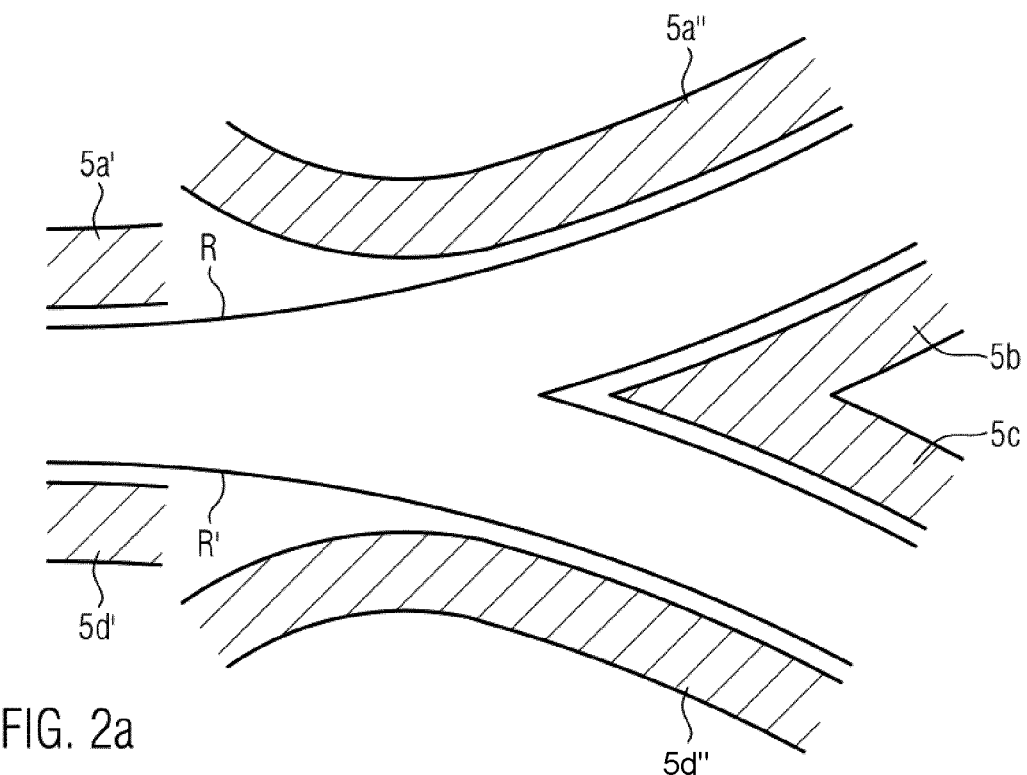
FIG. 2a and FIG. 2b show a switch with a larger air gap in the transition region between the transport track and the linear motor sections.

FIG. 2a shows an example of a switch according to the invention, in which the air gap in the transition region between the two linear motor sections and a moving transport element is greater than at least at another location of the transport track, for example, downstream. In particular, linear motor sections 5a" and 5d" in FIG. 2a are arranged in the transition region offset relative to the normal arrangement of linear motor sections 5a', 5d' and 5a" and 5d'" downstream of the transition region to the edge of transport tracks R, R', so that a larger air gap in the transition region between linear motor sections 5a" and 5d" and the edges of transport tracks R, R' and thus typically also between a transport element moving (typically along a guide) in the transition region arises.

The air gap can have its greatest value at the beginning of the transition region, as drawn in there by way of example. The first control operation of the movable transport element is typically carried out at this point, so that disturbances in this region are particularly disturbing, since they can very easily lead to the transfer of the movable transport element into the wrong track. Therefore, a reduction of the normal force is particularly advantageous in this region.

Figure 2B:
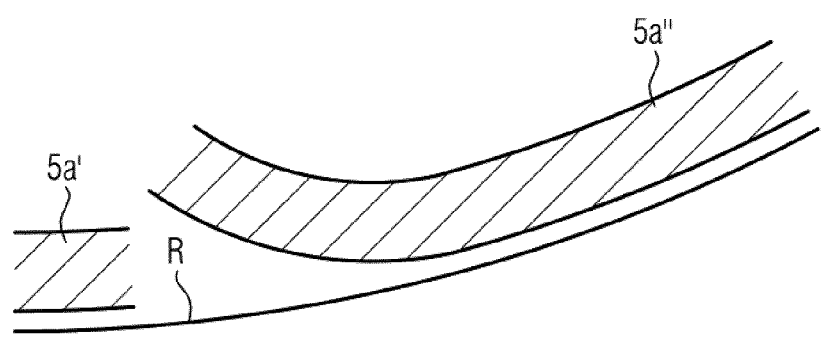
Figure 2B:
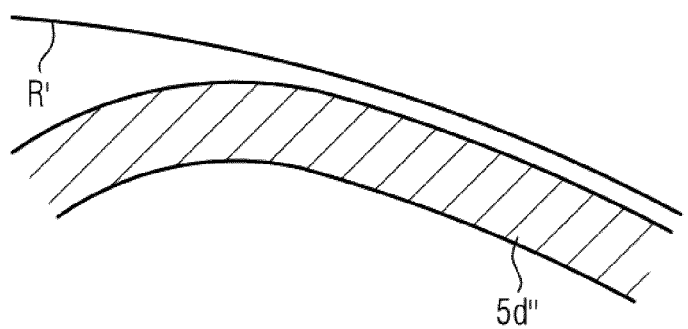

FIG. 2b shows a switch for a system in which the movable transport element in the transport system outside the switch is driven only by one linear motor section, e.g. on the main track (in the regions outside the transition region) by linear motor sections 5a' and 5a" and on the secondary track by linear motor section 5d", However, there is accordingly no linear motor section 5d' present in FIG. 2b. The air gap in the transition region between the two linear motor sections and a moving transport element can be enlarged also in such a system according to FIG. 2a, i.e. the distance between each one transport element and the linear motor section in the transition region is greater than e.g. downstream at the end of the switch or downstream of the switch when the movable transport element is further guided along this linear motor section. The further features described for FIG. 2a can likewise optionally be comprises by a switch as shown in FIG. 2b.

Figure 3A:
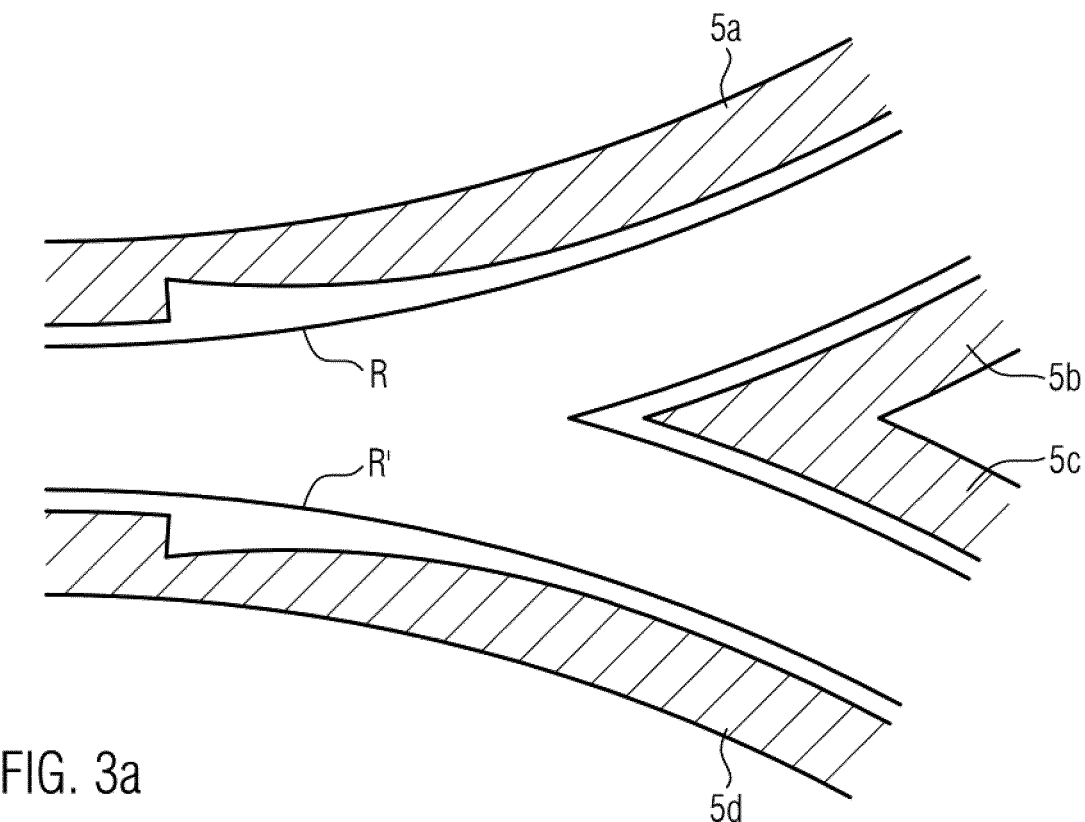
FIG. 3a and FIG. 3b show a different switch with a larger air gap in the transition region between the transport track and the linear motor sections.

FIG. 3a shows an alternative embodiment in which the air gap between the movable transport element and the linear motor sections in the transition region is likewise enlarged. Here as well, the largest value for the air gap can be present, in particular, at the beginning of the transition region. In the example shown, however, the linear motor sections are not arranged offset, but formed to taper, so that an enlarged air gap toward the edge of the transport tracks R, R' then arises and thereby also to a movable transport element on the transport track. Alternatively, the diameter of the linear motor sections can remain unchanged and only the core, e.g. the iron core, of the linear motor sections can be formed to taper (not shown).

Figure 3B:
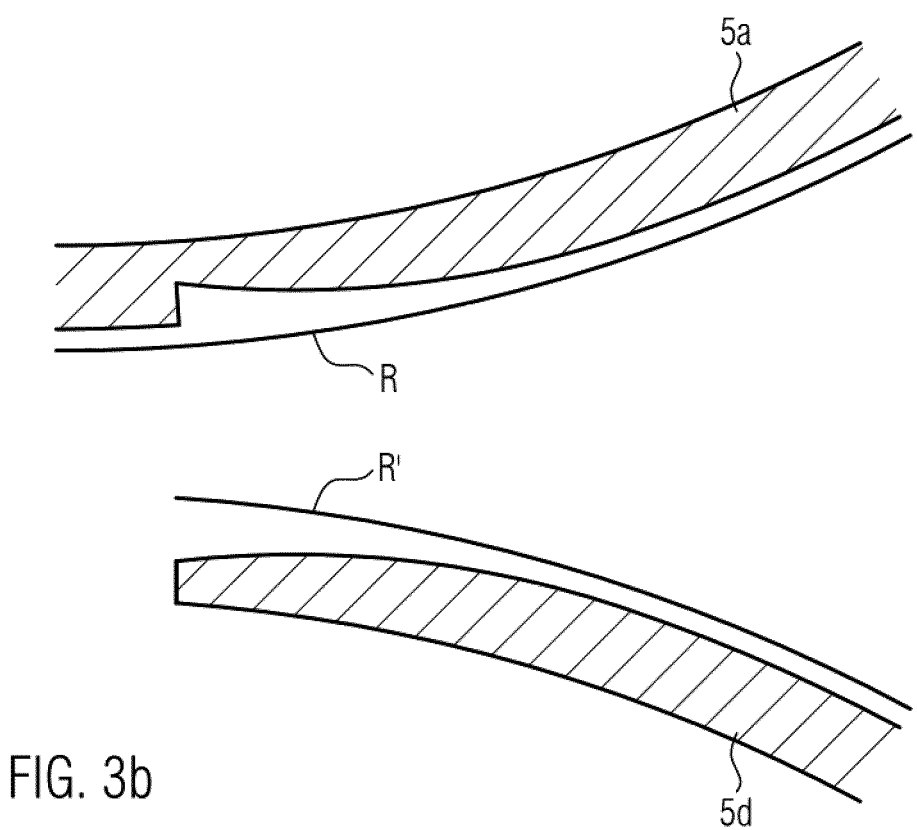

FIG. 3b shows a corresponding switch for a system in which the movable transport element in the transport system outside the switch is driven only by one linear motor section. The further features and alternatives described for FIG. 3a can optionally also be comprised by a switch as shown in FIG. 3b.

Figure 4A:
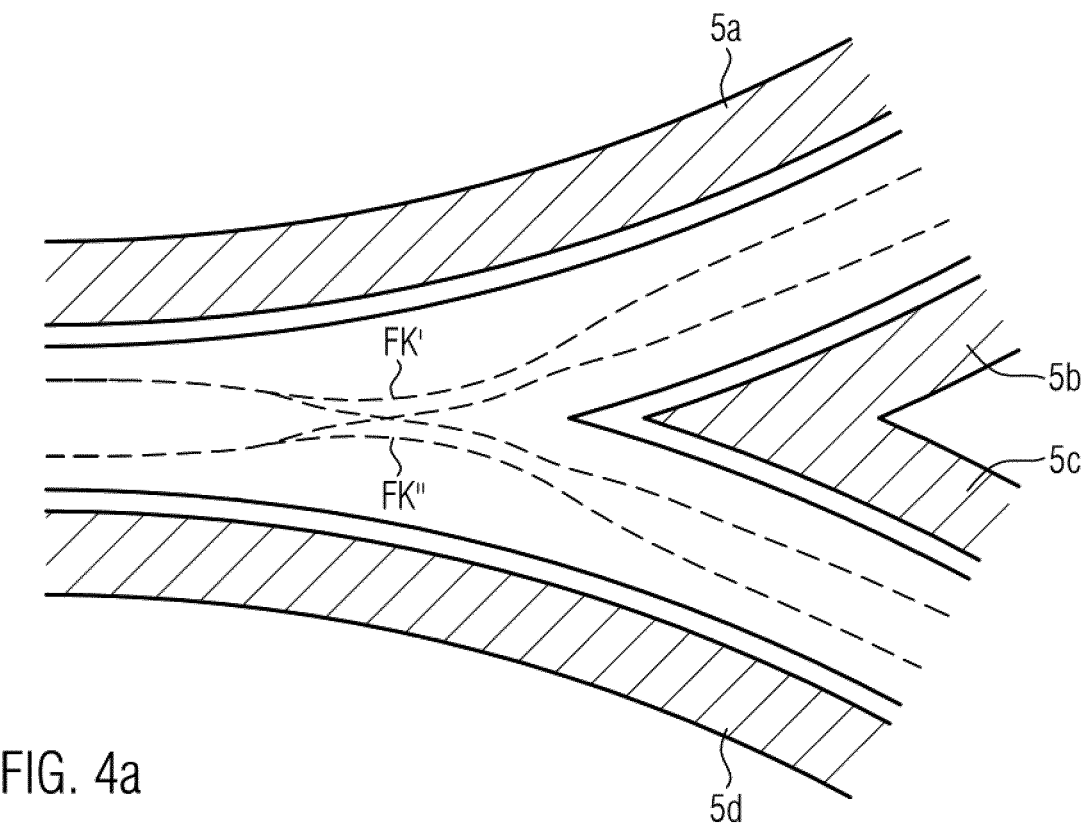
FIG. 4a and FIG. 4b show a further switch with a larger air gap in the transition region between the transport track and the linear motor sections.

FIG. 4a shows another example of a switch in which the air gap is enlarged. In the example shown, the air gap between linear motor sections 5a and 5d is enlarged in that the guide (presently by way of example in the form of guide curves FK', FK") is configured accordingly, i.e. leads away from the linear motor sections. Alternatively, the air gap can also be effected by enlargement of the switch region or as an arrangement of linear motor sections 5a and 5d further outwardly (not shown).

The enlargement of the air gap can be effected, for example, in that a unit of the guide and the motor section, in FIG. 4a for example 5d and FK", is moved by the desired additional distance from unit 5a and FK'. The distance between FK' and FK" can, for example, correspond to the previous unchanged guide distance in the switch (e.g. upstream or downstream). Due to the adjusted contour of the guide edges, similar to FIG. 4a, a larger air gap between the linear motor sections and the reaction element can then arise.

Figure 4B:
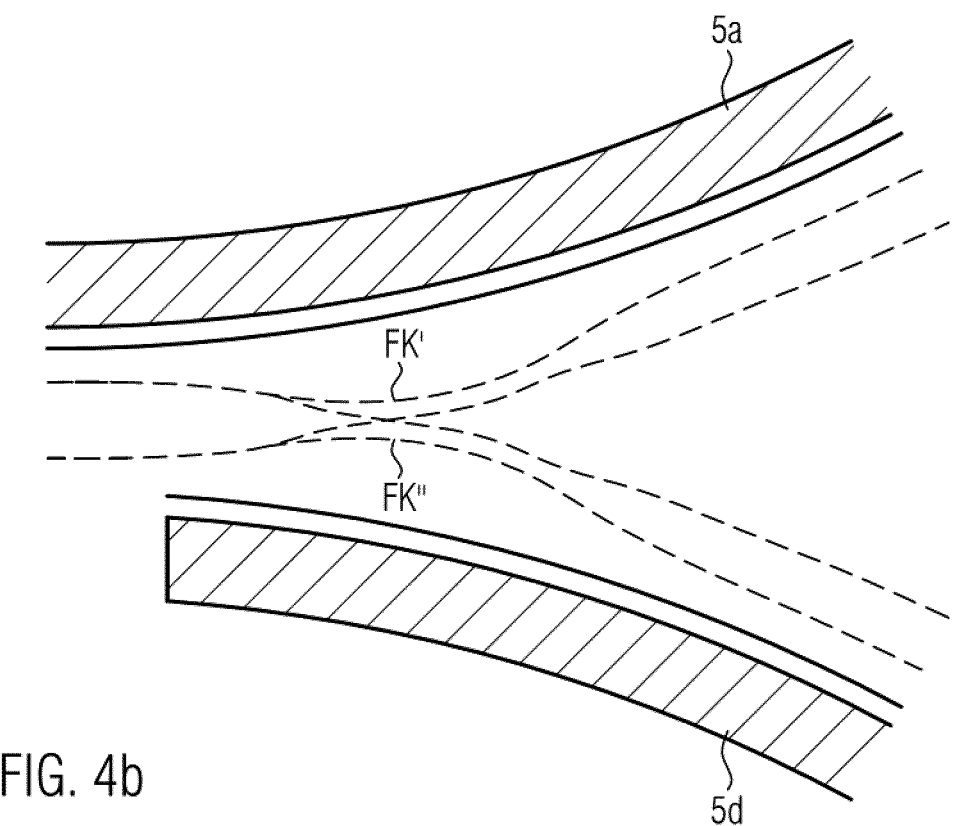

FIG. 4b shows a corresponding switch like in FIG. 4a for a system in which the movable transport element in the transport system outside the switch is driven only by one linear motor section. The further features and alternatives described for FIG. 4a can optionally also be comprised by a switch as shown in FIG. 4b.

Figure 5A:
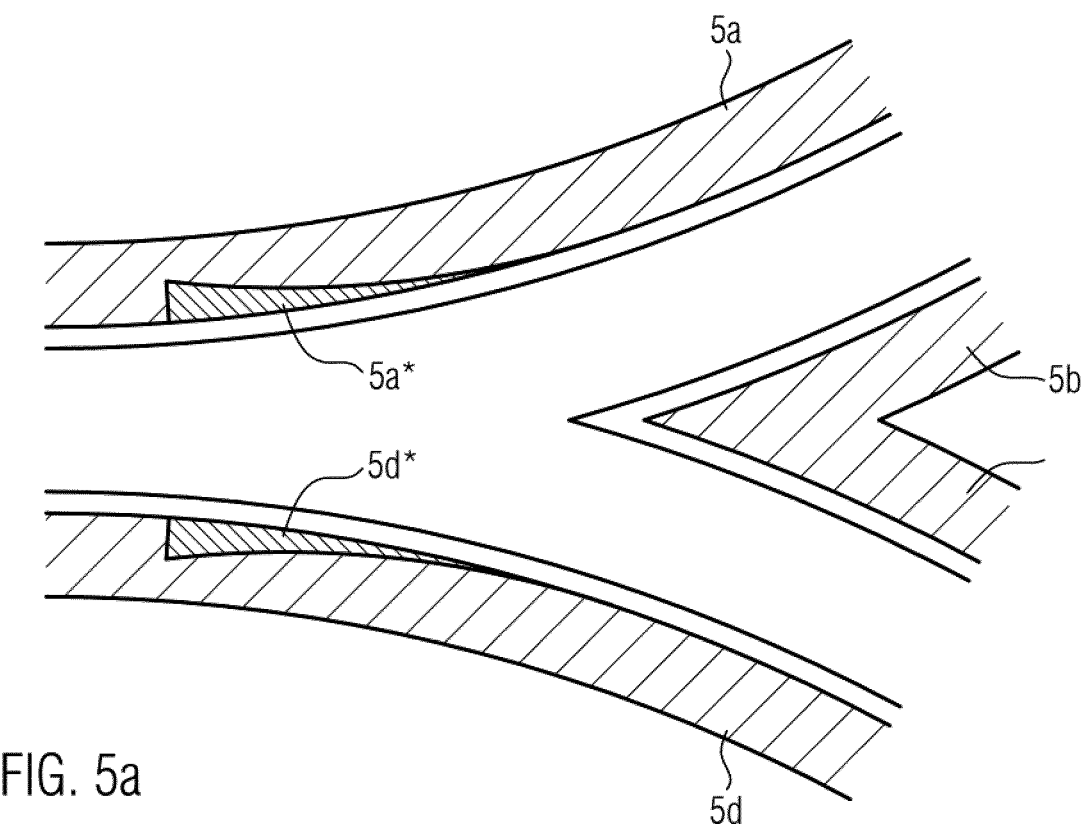
FIG. 5a and FIG. 5b show a switch in which the linear motor base body in the transition region is in part made of a different material.

FIG. 5a shows an embodiment of a switch in which a part of the linear motor base body is made of a different material than the remainder of the linear motor base body, in particular in the example of the linear motor base body shown, e.g. downstream of the transition region. In this case, a material with a lower magnetic conductivity than in other parts of linear motor base bodies 5a, 5d and linear motor base body 5b and 5c is typically used in regions 5a* and 5d*. This enables reducing the normal force in the transition region. If the replaced volume of the base body varies along the course of the base body, the largest portion of the linear motor base body at the beginning of the transition region is typically replaced with a different material, so that in the region in which disturbances typically have the most influence, the normal force is most reduced.

Figure 5B:
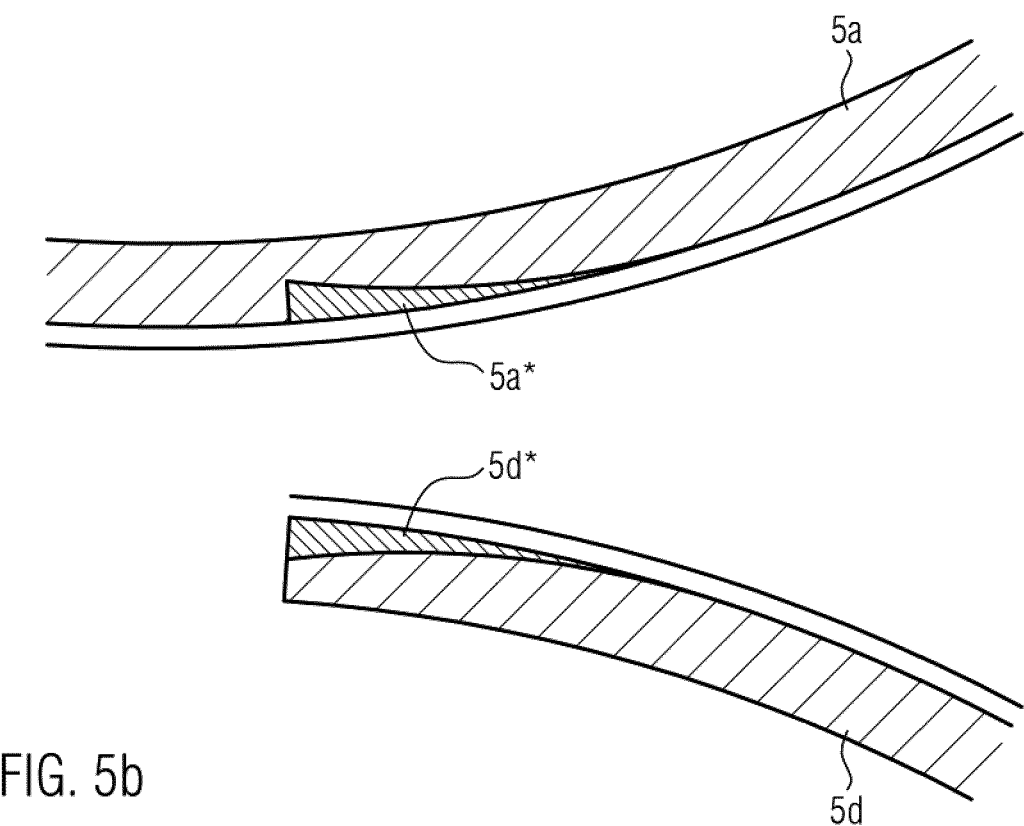

FIG. 5b shows a corresponding switch for a system in which the movable transport element in the transport system outside the switch is driven only by one linear motor section. The further features described for FIG. 5a can optionally also be comprised by a switch as shown in FIG. 5b.

Figure 6A:
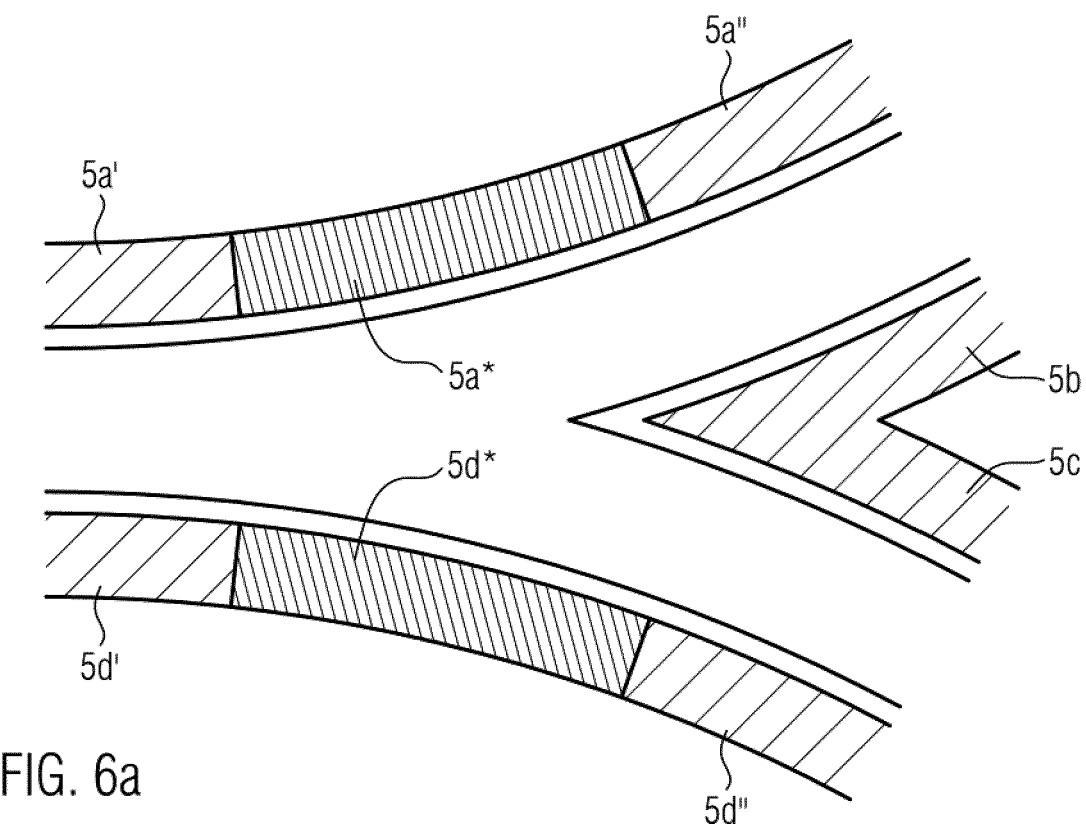
FIG. 6a and FIG. 6b show a switch in which the linear motor base body in the transition region is entirely made of a different material.

FIG. 6a shows an embodiment of switch in which the linear motor base body in regions 5a* and 5d* is formed entirely from a different material, typically having lower magnetic conductivity, e.g. than the linear motor base bodies in regions 5a', 5a", 5d', 5d". The different material is typically arranged in the transition region.

Figure 6B:
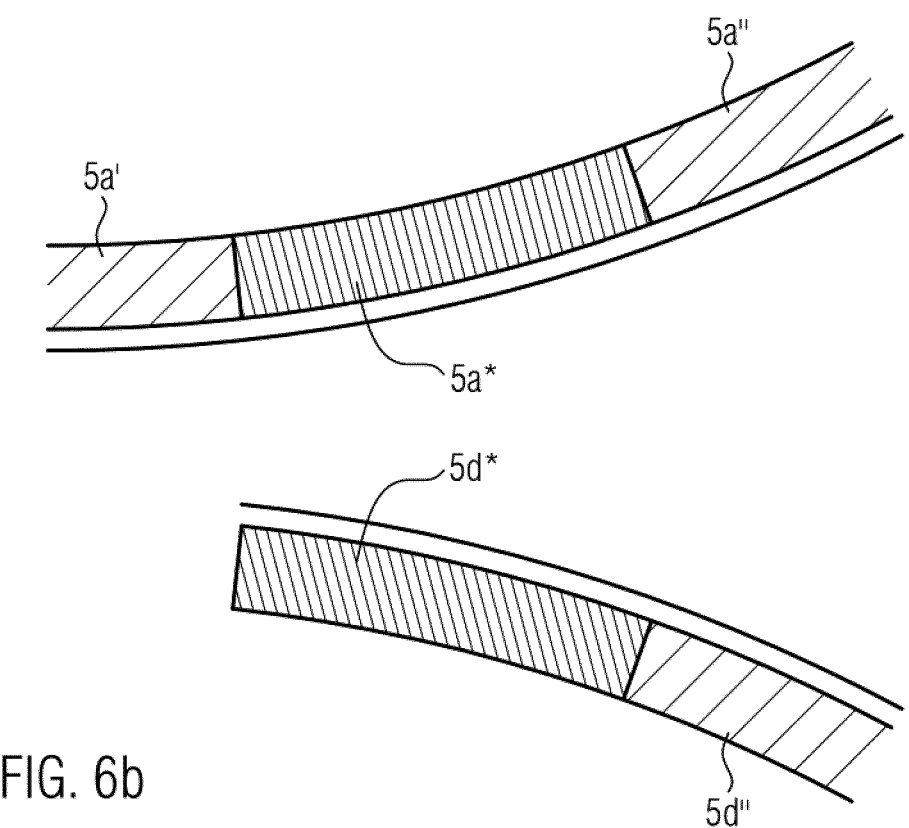

FIG. 6b shows a corresponding switch for a system in which the movable transport element in the transport system outside the switch is driven only by one linear motor section. Accordingly, linear motor section region 5d' does not exist in the switch shown. The further features described for FIG. 6a can optionally also be comprised by a switch as shown in FIG. 6b.

Figure 7:
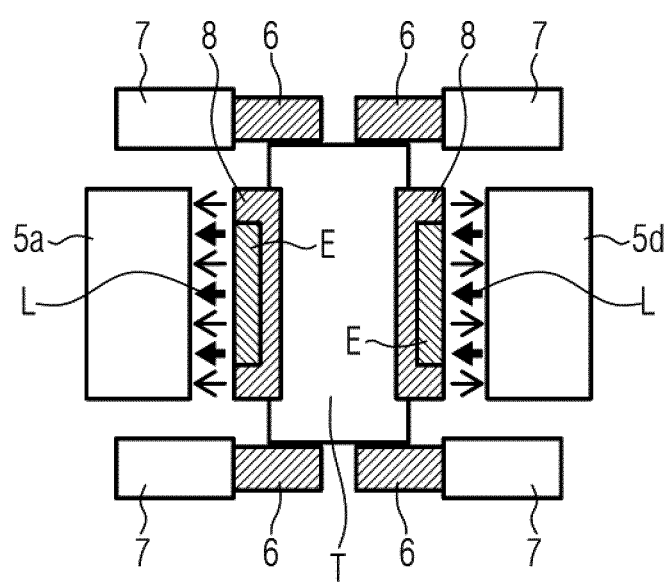
FIG. 7 shows a cross-section through a transport element in the transition region of a switch.

FIG. 7 shows a cross-section through a movable transport element T according to the invention. In the embodiment shown, the movable transport element comprises electromagnets E on both sides that are switchable independently. The example shows a cross-section through the transport element and linear motor sections 5a and 5d, namely in the transition region on the main track before the transport element is transferred into the secondary track or moved further along the main track, but while forces to guide the transport element are already acting on the selected track.

Here is the situation drawn in in which the two electromagnets E switchable independently of each other are switched in the same direction, so that they both in the interaction with the linear motors exert a force toward the left. On the side of the transport element T drawn in the figure on the left-hand side, electromagnet E increases the normal force, while the electromagnet on the side shown in the figure on the right reduces the normal force. Overall, an additional force is generated toward the left, so that transport element T would be guided in this direction, and accordingly can be directed onto the track on the left (e.g. the main track or the secondary track, depending on which one leads to the left). A power supply for electromagnets E is not drawn in, although typically present, at least in the transition region, in a system of the invention or in a switch in which such a transport element can be used. The power supply can be provided, for example, by way of brush pick-ups above and/or below the transport track.

Schematically drawn in also by way of example are a chassis 6 with guide 7 which, however, can also be formed differently than drawn. Such a guide can be present in a switch according to the invention only in the transition region, or only at the switch, or also in other regions of the transport system. Also drawn in are magnetic reaction elements 8 which can be formed, for example, as permanent magnets.

Electromagnets E can also be switched differently, for example, in such a way that the normal force on the right-hand side is strengthened and weakened on the left-hand side. In further embodiments, individually switchable electromagnets E instead of permanent magnets 8 can also assume the task of the magnetic reaction element. Non-switching electromagnets instead of the permanent magnets can also be used as magnetic reaction elements 8 in other embodiments.

Figure 8:
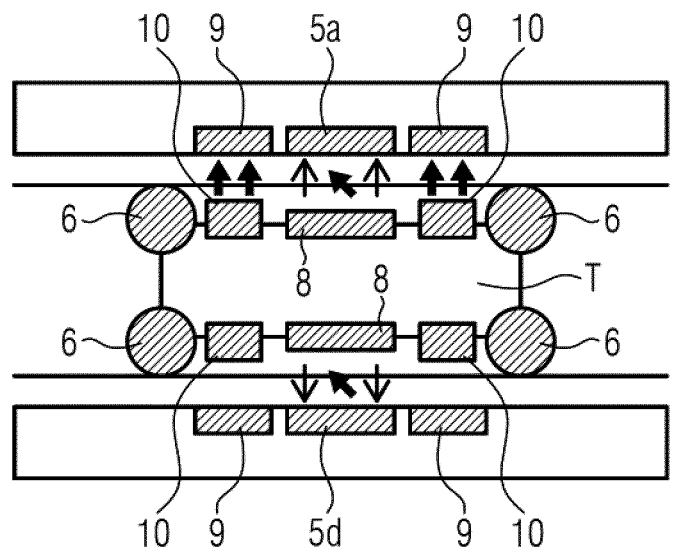
FIG. 8 shows a cross-section through a transport element in the transition region of a switch.

FIG. 8 shows a cross-section through a transport element T on a transport track. Drawn in are schematic chasses 6 (which can also be formed differently than drawn), linear motor sections 5a and 5d, and magnetic conductive passive components 10 of the transport element, which are configured to act together with actuatable coils 9 in the transition region of the switch that are present in addition to the coils of the linear motor sections to add a respective switching force and thus increase the switching force.

In the example shown in FIG. 8, coils 9 are switched such that the additional switching force acts upwardly. Other switching is possible, e.g. the coils can be switched such that the additional switching force acts in the figure downwardly (not shown). When viewing a first plane through (transport track and) the (middle or symmetry plane of the) linear motor sections and a second and third plane perpendicular thereto and parallel to the direction of the transport track (or the direction of motion of a movable transport element on the transport track) each through the side of a linear motor facing the transport track (or the point of the linear motor closest to the transport track), additional coils 9 in the example shown are by way of example each arranged (at least with the side facing the transport track or the point closest to the transport track) in the same plane as a linear motor section, i.e. in the second and third plane.

Figure 9:
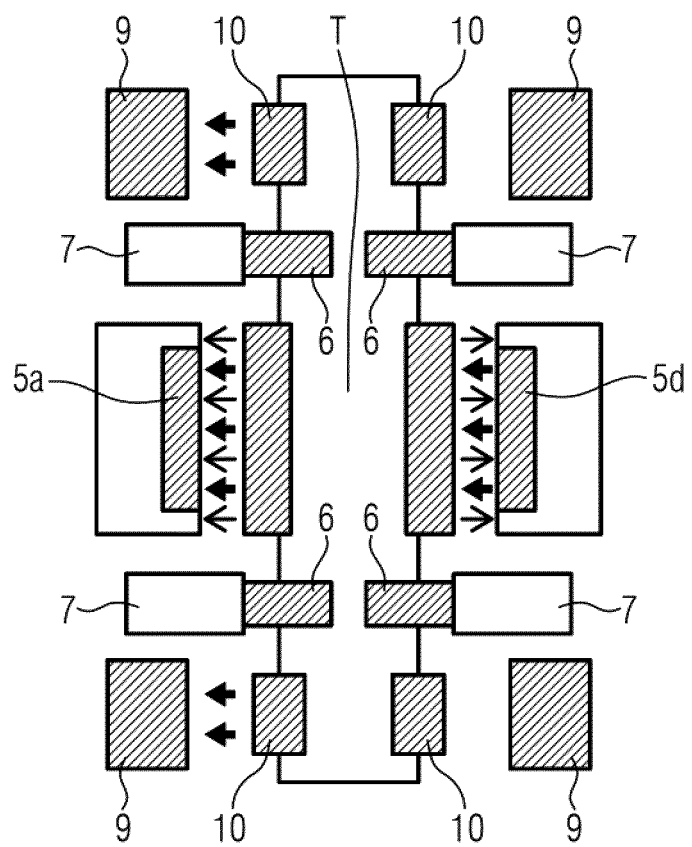
FIG. 9 shows a cross-section through a transport element in the transition region of a switch.

In FIG. 9, there is a similar arrangement as in FIG. 8, only that in the example shown, additional coils 9 are not disposed in the same plane as the linear motor sections, i.e. not in the second and third plane discussed with reference to FIG. 8, but in relation to the second or third plane are on a plane parallel thereto, but further away from the transport track than the second or third plane.

FIG. 9 shows a connection schematically where coils 9 together with components 10 exert a switching force toward the left, and a switching force is also generated at the same time to the left by switching linear motor sections 5a and 5d, since linear motor section 5a is switched in such a way that the normal force is increased, and linear motor section 5d is switched in such a way that the normal force is reduced. Other connections (presently not shown) are of course possible, e.g. to generate a switching force in the direction of the figure towards the right.

The invention claimed is:

1. A switch of a transport system for a movable transport element, comprising:
   a main track;
   a secondary track; and
   a transition region, the transition region comprising:
      a section of the main track, the section of the main track comprising a first linear motor section, the first linear motor section configured to move the movable transport element along the main track; and
      a section of the secondary track branching off from the main track, the section of the secondary track comprising a second linear motor section, the second linear motor section configured to move the movable transport element along the secondary track,
      wherein the first and second linear motor sections are configured to generate switching forces to guide the movable transport element through the transition region onto the main track or to switch the movable transport element to the secondary track,
      wherein a switching force generated by the first linear motor section differs from the switching force generated by the second linear motor section, and
      wherein the first linear motor section is configured to carry a larger current than linear motor sections outside of the transition region, and wherein the second linear motor section is configured to carry a larger current than linear motor sections outside of the transition region.

2. The switch of claim 1, wherein switching forces generated by the first linear motor section and second linear motor section correspond to strengths of magnetic fields produced by the first linear motor section and the second linear motor section.

3. The switch of claim 1, wherein:
the movable transport element comprises passive magnetic elements,
wherein the first linear motor section comprises wound stators having a greater number of turns than stators outside of the transition region, and
wherein the second linear motor section comprises wound stators having a greater number of turns than stators outside of the transition region.

4. The switch of claim 1, wherein in the transition region comprises at least one of cooling fins, water cooling, or a cooling fan is provided.

5. The switch of claim 1,
wherein the first linear motor section comprises a first stator with a first set of coils,
wherein the second linear motor section comprises a second stator with a second set of coils, and
further comprising actuatable coils in the transition region, the actuatable coils configured to increase switching forces generated by the first linear motor section and the second linear motor section.

6. The switch of claim 5, wherein the actuatable coils, first linear motor section and second linear motor section are coplanar.

7. The switch of claim 5, wherein the actuatable coils are disposed in a separate plane from at least one of the first linear motor section or second linear motor section.

8. A movable transport element for a transport system, comprising:
a chassis;
one or more magnetic reaction elements;
two independently switchable electromagnets; and
one or more magnetically conductive passive components,
wherein the magnetically conductive passive components are configured to interact with actuatable coils of linear motor sections in a transition region to increase a switching force exerted upon the movable transport element.

9. A transport system for a movable transport element, comprising:
a transport track; and
a switch connected to the transport track, the switch comprising:
a main track;
a secondary track; and
a transition region, the transition region comprising:
a section of the main track, the section of the main track comprising a first linear motor section, the first linear motor section configured to move the movable transport element along the main track; and
a section of the secondary track branching off from the main track, the section of the secondary track comprising a second linear motor section, the second linear motor section configured to move the movable transport element along the secondary track,
wherein the first and second linear motor sections are configured to generate switching forces to guide the movable transport element through the transition region onto the main track or to switch the movable transport element to the secondary track,
wherein the switching force generated by the first linear motor section differs from the switching force generated by the second linear motor section, and
wherein the first linear motor section is configured to carry a larger current than linear motor sections outside of the transition region, and wherein the second linear motor section is configured to carry a larger current than linear motor sections outside of the transition region.

10. The transport system of claim 9, further comprising:
a first movable transport element, the first movable transport element comprising:
a chassis;
one or more magnetic reaction elements; and
one or more magnetically conductive passive components,
wherein the magnetically conductive passive components are configured to interact with actuatable coils of linear motor sections in the transition region to increase a switching force exerted upon the first movable transport element.

* * * * *